United States Patent [19]

Clark

[11] 4,453,817

[45] Jun. 12, 1984

[54] AUTOMATIC PHOTOGRAPHIC PROCESSING APPARATUS UTILIZING A MICROCOMPUTER

[76] Inventor: Warren P. Clark, 10 Evans Dr., Wilmington, Mass. 01887

[21] Appl. No.: 441,817

[22] Filed: Nov. 15, 1982

[51] Int. Cl.[3] .................... G03B 3/08

[52] U.S. Cl. .................... 354/299; 354/312; 354/323; 354/330

[58] Field of Search .................... 354/299, 312, 323, 327, 354/329, 330, 324

[56] References Cited

U.S. PATENT DOCUMENTS

| | | | |
|---|---|---|---|
| 3,589,264 | 6/1971 | Jensen | 354/323 |
| 3,623,416 | 11/1971 | Anderberg | 354/299 |
| 3,703,860 | 11/1972 | Wilkinson | 354/299 |
| 3,840,214 | 10/1974 | Merz | 354/330 |
| 3,982,259 | 9/1976 | Baerle | 354/323 |
| 4,035,818 | 7/1977 | King | 354/323 |
| 4,074,298 | 2/1978 | Cartwright | 354/299 |
| 4,206,993 | 6/1980 | Csepke | 354/323 |

*Primary Examiner*—A. A. Mathews

*Attorney, Agent, or Firm*—Donald J. Singer; William Stepanishen

[57] ABSTRACT

An automatic photographic paper and film developing apparatus utilizing a micro-computer to control the sequential steps of developing film automatically. Once film is loaded in a light tight drum, the steps of filling and draining the developing chemicals and rotating the film drum to develop the film are automatically and sequentially performed under the control of the microcomputer.

6 Claims, 3 Drawing Figures

AUTOMATIC PHOTOGRAPHIC PROCESSING APPARATUS UTILIZING A MICROCOMPUTER

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a photographic developing machine, and in particular to an automatic photographic paper and film developing apparatus.

The darkroom and the equipment associated therewith is required to develop photographic paper and film. The darkroom may range from total darkness to room light with safe lights. When the loading and unloading of film and plates in holders of cameras and the processing of films, plates, and paper must be done in the open, these operations are done in the darkroom. The basic darkroom equipment consists of safelights, which are lamp houses with filters to illuminate the room with light of a color which will not fog the sensitive material in a reasonable time and which give maximum visibility consistent with this safety; benches and sinks with running water and drains; tanks and hangers for processing plates and sheet films vertically; tanks for roll films which are usually cylindrical and light-tight and contain a reel onto which the film is wound in a spiral with space convolutions to permit access of the solutions; flat trays for sheet film, plates, and paper sheets and occasionally short roll films: thermometers for determining temperatures of solutions or mixing valves to give water of desired temperature in whioh solutions in tanks are immersed; special multiple tank units for color photography; tanks, trays, or special washers for washing negatives and prints; dryers, ranging from simple clips for hanging negatives in the open air to cabinets having forced warm air, special dryers for prints including simple blotting, paper sheets, and heated flat, drum, or belt dryers, including some which ferrotype (that is, gloss) the prints by drying them in contact with a polished surface; clocks and preset timers; printers and enlargers; print trimmers; and in specialized work, desitometers, printing exposure meters, and focusing devices.

For professional processing of negatives, positives, and reversal positives, both black-and-white and color, and for processing prints on a large scale (for example, in the photofinishing industry) continuous film and roll-paper-processing machines and automatic or semiautomatic printers for contact printing or enlarging onto sheets of rolls of paper are used. Continuous machines are made for processing sheet film and x-ray negatives in sheet form on a large scale, and many continuous processing roll-film or sheet machines have been designed for special purposes, such as aerial photography, microfilming, scientific recording, drawing reproduction, and motion picture film. Roller transport processors are made for rapid stabilization processing of paper prints, especially for papers with incorporated developers. In drum processors, prints are wrapped about a drum revolving rapidly in the solution. However, for the small scale film processor or the amateur photographer/developer, automatic photographic developing equipment is neither available or economically practical. The present invention provides an automatic photographic paper and film developing apparatus for the small scale film developer.

SUMMARY OF THE INVENTION

The present invention utilizes a light tight drum in which the development of the paper or film occurs. The drum is automatically and sequentially filled with and drained of a series of chemical agents which react with the photographic materials to be developed. Each step in the photographic process occurs automatically and in the proper sequence, i.e. the rotation of the drum and the fill/drain chemical sequence since the complete development process is controlled by a microcomputer unit with a memory unit.

It is one object of the present invention, therefore, to provide an improved automatic photographic paper and film developing apparatus.

It is another object of the invention to provide an improved automatic photographic paper and film developing apparatus which performs a complete photographic development sequence without operator interaction.

It is yet another object of the invention to provide an improved automatic photographic paper and film developing apparatus which operates in a fully lighted room once the drum is loaded.

It is a further object of the invention to provide an improved automatic photographic paper and film developing apparatus which is economical to produce and utilizes conventional currently available components that lend themselves to standard mass production manufacturing techinques.

These and other advantage, features and objects of the invention will become more apparent from the following description in connection with the illustrative embodiment in the accompanying drawings.

DESCRIPTION OF THE PREFERRED EMBODIMENT

Figure 1:
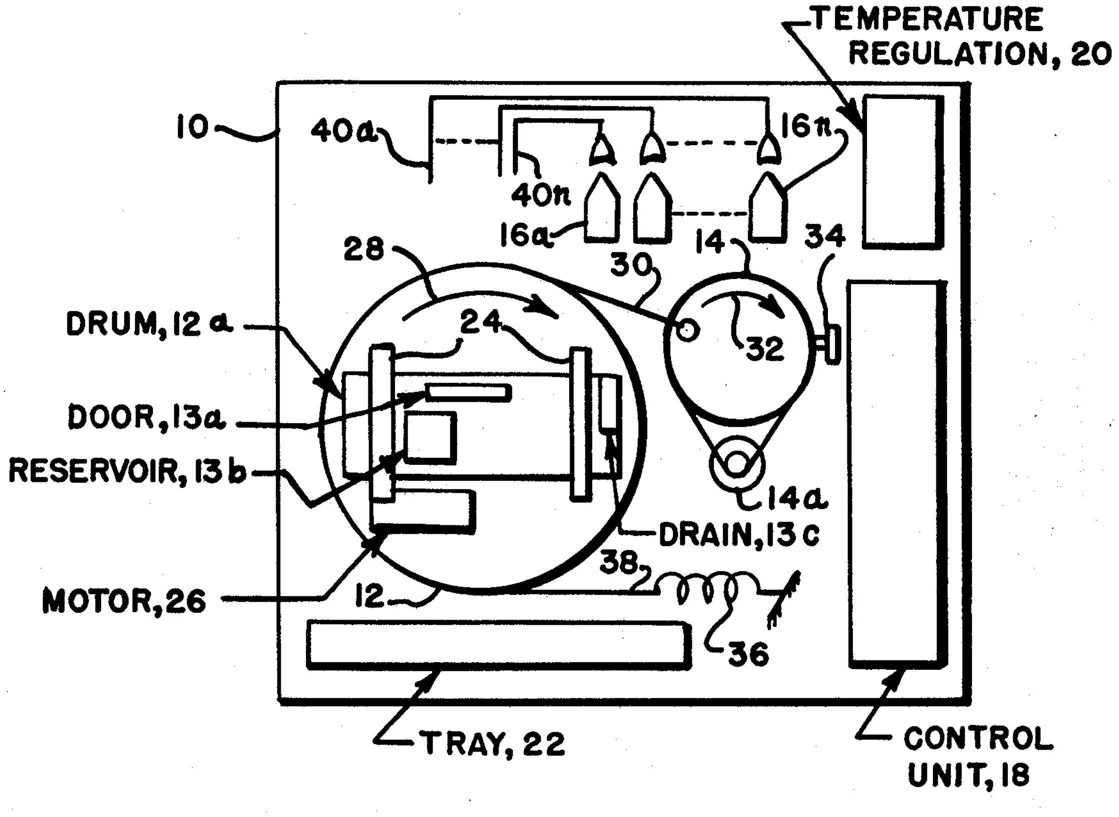
FIG. 1 is a front view of the automatic photographic paper and film developing apparatus according to the present invention.

Referring now to FIG. 1, there is shown a typical component layout of the units and subunits that comprise the automatic photographic paper and film developing system. A holding structure 10 which may be either merely a plate upon which the various subunits are mounted or an enclosed structure with an access means to the units therein, is shown in the present example. There is mounted to the holding structure 10 a large disk 12, a small disk 14, a plurality of bottle/pump combinations **16*a*–16*n*, a control unit 18, a temperature regulation unit 20 and a tray 22**.

The large disk 12 has a light tight drum **12*a* which is mounted to the disk by brackets 24. The light tight drum 12*a* has a suitable door means 13*a* to provide access to the inside of the drum. There is a reservoir means 13*b* which is contained in the top of the drum. There is a drain means 13*c* which is contained in the bottom of the drum 12*a*. A motor unit 26 which is mounted to the disk 12 is provided to rotate the drum 12*a*. The large disk 12 is fastened to the holding structure 10 by a conventional means that allows to the large disk 12** to rotate in the direction indicated by the arrow 28. A smaller disk 14 which is driven by a motor 14*a* is connected to the larger disk 12 by a cable 30. Disk 14 is rotated in the direction indicated by the arrow 32 for approximately 180° from its normal position by motor 14*a*, at which point switch unit 34 is activated to shut off the motor and thereby stop the rotation of disk 14. A spring 36 which is attached to the large disk 12 by a cable 38 returns the disk 12 to its initial position in which the drum 12*a* is horizontal.

A plurality of bottle/pump units 16*a*–16*n* are conveniently positioned on the holding structure 10 to provide easy access of the filter tubes 40*a*–40*n* to the top of the drum 12*a* when it is rotated to the vertical position. The bottle/pump units 16*a*–16*n* which contain the various photographic chemicals for the development process, receive control signals from the control unit 18. A temperature regulation unit 20 is provided to maintain the environment of the present development apparatus at a desired predetermined temperature, or in either of the following alternative methods, maintaining the proper temperature for the photographic chemicals directly in the bottles or indirectly by maintaining the bottles in a temperature regulated bath.

Figure 2:
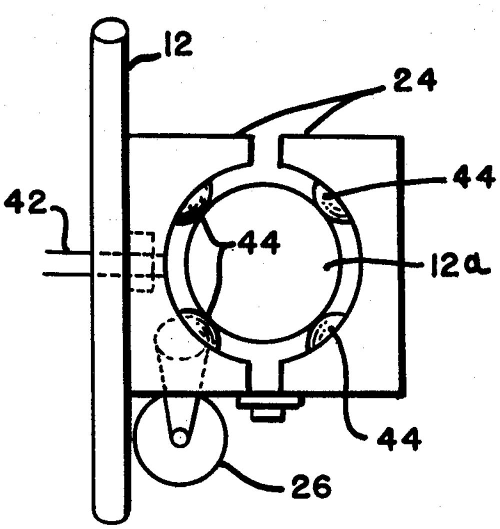
FIG. 2 is a side view of the large disk element in FIG. 1 showing the disk in greater detail, and, FIG. 3 is a logic block diagram of the control unit.

Turning now to FIG. 2, there is shown a side view of the large disk 12 of FIG. 1. The large disk 12 is shown mounted on a conventional type pivoting means 42. The large disk 12 comprises the drum rotation subsystem which holds the drum unit 12*a* horizontally in two drum clamps 24. These drum clamps 24 have four wheels 44 on the inside to permit the drum 12*a* to rotate when the motor 26 rotates the drum. These components which are all mounted on the large disk 12 are the basis of the tilt to empty subsystems.

The automatic photograph developing system which is comprised of six subsystems, light tight drum, drum rotation, drum tilt to empty, chemical fill, control, and temperature regulation, operates in the following manner. The light tight drum 12*a* is similar to standard commercially available items sold by several photo equipment manufacturers. The paper (or film) is placed inside the drum 12*a*. When the drum 12*a* is held vertically, chemicals are poured into the top and are held in a small reservoir. When the drum 12*a* is tilted to the horizontal position, the chemicals flow from the reservoir into the main part of the drum 12*a* coming into contact with the paper (or film). Standard operation is to rotate the drum 12*a* along its main axis so that the small amount of chemical will make contact with the entire surface of the paper. When the process is finished with that chemical, the drum 12*a* is again held vertically to allow the old chemical to flow out the bottom of the drum and to allow new chemicals to be placed in the reservoir.

The fill/drain operation is accomplished by rotating the large disk 12 to the vertical position thereby causing the drum 12*a* to tilt to the vertical position. This tilt is caused by the second motor 14*a* which turns the smaller disk 14. A small switch 34 near the smaller disk 14 is interlocked with this motor 14*a* to insure that this disk 14 is rotated 180 degrees each time it is activated. Attached to the disk 14 is a cable 30 which when the disk rotates the first 180 degrees, it pulls the cable causing the large disk to tilt to the vertical position. A tray 22 is placed beneath the drum 12*a* to catch the chemicals which drain at this time. When the small disk 14 rotates the second 180 degrees, the cable 30 is relaxed and a spring 36 pulls the larger disk 12 back to the horizontal position. The chemical fill subsystem feeds chemicals into the drum 12*a* to develop the paper or film. It consists of several liquid containers 16*a*–16*n* with a small pump for each container, and plastic tubing 40*a*–40*n* from each pump to a point directly over the top of the drum 12*a*. When a chemical is to be fed into the drum 12*a*, the control subsystem 18 will activate the proper pump for the time necessary to load the proper amount of chemical.

Figure 3:
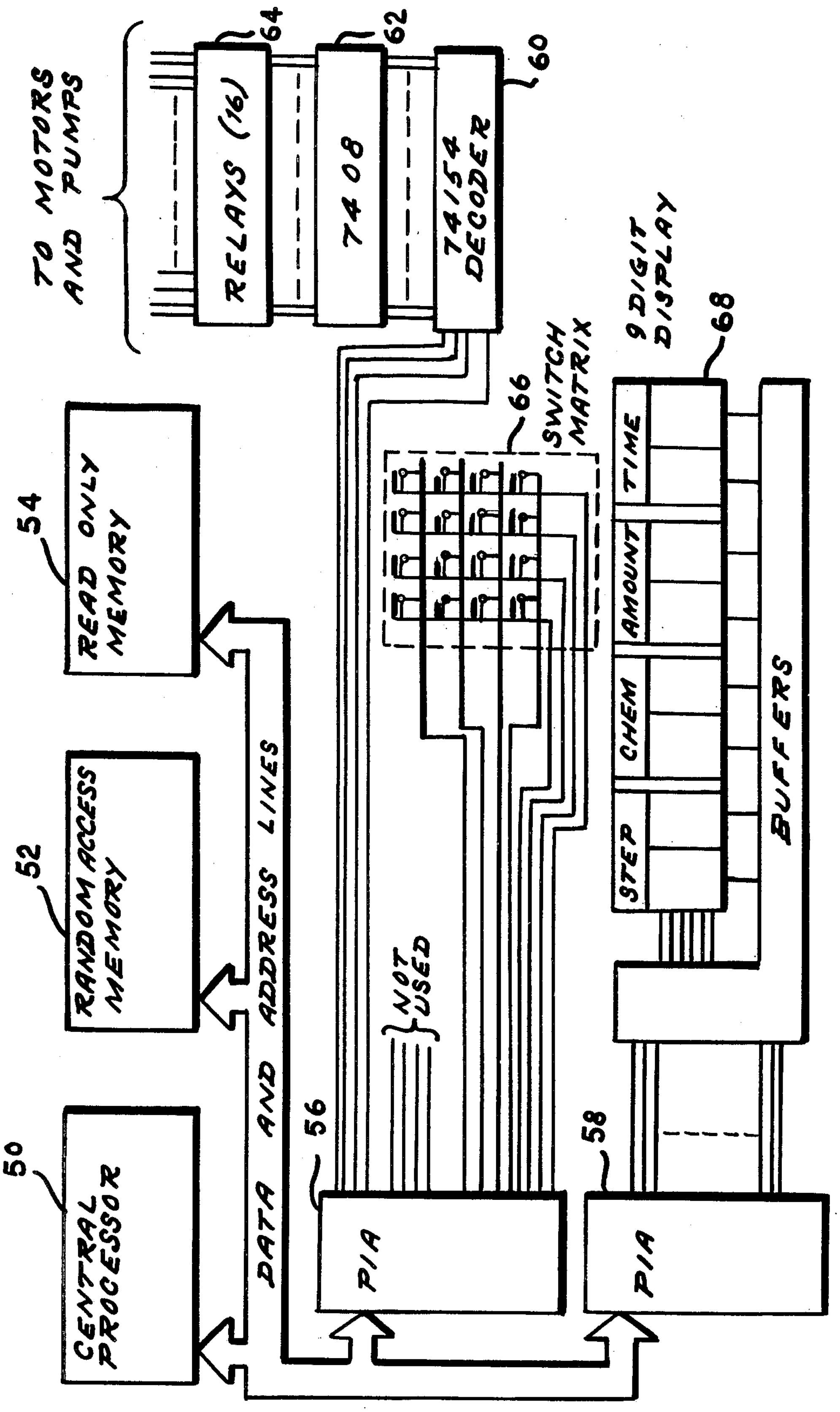

There is shown in FIG. 3, a block diagram of the control unit which controls and coordinates the sequence of operations within the development apparatus. The control unit comprises a microcomputer 50 with a random access memory 52, read only memory 54 and interfacing elements. The read only memory 54 stores the microcomputer program. The random access memory 52 stores control variables plus the sequence of instructions which may be entered by the operator. The first peripheral interface adaptor unit 56 is used for two functions. In the first function, four of its outputs are fed through a 74154 four line to sixteenline decoder unit 60. The sixteen outputs of the decoder unit 60 are fed through a 7408 inverter buffer unit 62 to each drive a small relay. The small relays 64 control the two motors to each drive a small relay 64. The small relays control the two motors and up to 14 chemical feed pumps. The second set of outputs from this peripheral interface adapter 56 are used to control a switch matrix 66 for operator input. Four of these lines are outputs to scan a 4×4 switch matrix 66 and four more are inputs to read the switch depressions during the scans. The second peripheral interface adapter 58 drives a set of multiplexed output displays 68. Of the sixteen lines out of this peripheral interface adapter 58, seven lines indicate which segments of each digit will be turned on, and the other nine lines indicate which digit will be on at each instant of time. The temperature regulation subsystem 20 maintains a constant temperature inside the system enclosure for the chemicals. It comprises an adjustable thermostat and a heating element.

The control subsystem which is central to the operation of the invention, functions to control the various electrical units in the photographic developing machine. The control subsystem may be accomplished through the use of the following elements. The central processor unit 50 in a typical implementation, may be any of the various micro-computer integrated circuits presently commercially avaliable such as the Motorola 6800. The read only memory unit 54 may be any of the various integrated circuits designed for storage of micro-computer programs and data such as the Motorola 68. The random access memory (RAM) unit 52 may be any of the various integrated circuits designed for the temporary storage of micro-computer programs and data such as the Motorola 68. The peripheral interface adaptors (PIA) units, 56, 58 may be any of the various integrated circuits designed for the purpose of buffering data to and from micro-computer integrated circuits such as the Motorola 68. The Motorola 68 has two separate eight bit data lines. Each of these data lines can be defined by the central process unit 50 as an input or output. The central process unit 50 can then place data on these output lines or read data from input lines which have been set by an external device.

In the particular implementation shown above, the read only memory unit 54 stores a computer program which is exeouted by the central process unit 50. The random access memory unit 52 stores a computer program which is executed by the central process unit. The random access memory unit 52 stores temporary data used by the program including coded commands of the machine operator.

The first peripheral interface adapter unit 56 is used for two functions. The first function uses four of the eight data lines from the first set of eight data lines in the peripheral interface adapter unit 56 as output data lines. These are fed to a 74154 four line to sixteen line output decoder unit 60. These sixteen lines feed up to sixteen electronic or mechanical relays 64 and these relays in turn operate up to sixteen motors, pumps, or other electro-mechanical devices. The second function of the first peripheral interface adapter unit 56 uses four of the second eight data lines as output lines and four others as input data lines. These eight lines operate a switch matrix which enables the operator to control the machine. The central process unit 50, under control of the program in the read only memory unit 54 places an active signal on only the first of the four output lines and then reads the input from the four input lines. If one of the switches is closed, an active signal will be read on the corresponding input line and the machine accepts the presence of this active signal as a command or data from the machine operator. The central process unit 50 individually activates each of the four output lines to get data from all sixteen switches.

The second peripheral interface adapter unit 58 is used to display data to the operator through a set of nine multiplexed, seven segment displays. All sixteen of the available data lines are outputs. The first nine are used to enable each of the nine displays in turn. The next seven activate the appropriate segments of the particular display being activated. By changing the digit which is activated a few hundred times per second, the operator perceives continuous display of all nine digits.

There are two basic states of operation of the machine: "Set-Up" and "Develop." In the Set-Up state, the machine is accepting a sequence of commands from the operator. In the Develop State it is using these commands to develop photographic film on paper following the commands entered by the operator in the Set-Up mode.

The Set-Up state uses the sixteen switches discussed above. Each of these switches is marked with one of the following codes: Digits 0–9, Pause/continue, Skip, Cancel, End, Develop, Program. In typical operation, the operator switches the Set-Up state by depressing the program switch. The display would indicate a stop number of 01. The operator would specify the two digit code of the chemical to be used in the stop, the amount of chemical to be used, and the time it should be left in the drum. The machine would then indicate step 02 and the operator would enter the commands for that step. The operator could use the cancel to back up our incorrect entries. When all steps are entered, he would depress the END key to terminate the Set-Up state.

The Develop state is initiated after the operator has placed the material to be developed in the light tight drum. The operator starts the process and then can leave the machine until the process is complete. The machine performs the steps in sequence. That is, it pumps the proper amount of the proper chemical into the drum as specified by Step 1 during the Set-Up mode. It rotates the drum to a horizontal position and then begins to revolve along the other axis for the time specified by Step 1. At the end of this time it rotates the drum back to the vertical position allowing the chemicals to drain from the drum. Step 2 then takes over. This process can be interrupted, continued, or aborted at any time by use of the pause, resume or cancel keys. Normally, there would be no operator intervention and the process would continue until the last step has been completed. At this time, the operator could either restart the develop state or reprogram the device by using the Set-Up state.

The following section is a description of a computer program which is used to drive the automatic photographic development apparatus that was described previously. The program is not written in any particular language, but instead is presented as a detailed functional specification and a step-by-step description of what the program should do. After the apparatus is powered up, the initialization routine is executed, control then passes to a MAIN calling program. This calling program calls any of the five subroutines in each pass depending upon the status of the mode. The enter MAIN loop must be executed at least 100 times per second in order to scan the switch matrix (READ) and refresh the display (DISPLAY). During each pass the system calls CHECK to see if a command has been entered which would cause a Mode, Step, or Phase change. If a number has been entered in set up mode, Set up is called. If Mode indicates the develop state, a pass is made through DEVELOP and counters, Step holder, and Phase holder are updated.

INITIALIZE - allocate memory space and initial values as defined below

| | |
|---|---|
| Mode-I | 1 stand by mode<br>2 set up mode<br>3 develop mode |
| Step-0 | Holds the present step number during set up and develop mode |
| Phase-0 | During develop, each step has 5 phases<br>0 - Initialize<br>1 - Input Chemicals<br>2 - Rotate to horizontal<br>3 - Spin<br>4 - Rotate to vertical |
| Present-Read-225 | Present switch matrix reading - a value from 0-15 if one switch is depressed is 255 if no switch is depressed. |
| Previous-Read-225 | Previous switch matrix reading for |
| Read-Counter-0 | Keeps track of how many passes the switch matrix reading has been a constant other than 255 - used for switch debounce |
| Read-Output-254 | Set to switch matrix reading once Read-Counter exceeds the threshold specified in the program. Reset to 254 after the out is used. |
| Display-Digit-1 | Number of next display digit to be refreshed. |
| Set UP-Digit-3 | Next digit to be set by the SET UP routine |
| Digit (I)-blank | For values of 1 from 1 to 9 - what is being DISPLAY |
| Phase-Counter-0 | Number of passes through DISPLAY since last phase change |
| Phase-Max-0 | Number of passes through DISPLAY desired during present Phase |
| Chem-Factor-? | A factor by which the amount of chemistry called for in a particular step should be multiplied to get the the Phase-Max for the prime chemistry phase |
| Dev-Factor-? | Similar to Chem-Factor but for drum spin phase |
| Rotate Factor | Phase Max for rotating the drum |
| Chem (I) 254 | For values of I from 1 to the maximum number of steps allowed - the type of chemistry desired in this step. |
| Amt (I) 0 | Amount of chemistry desired in this |

-continued

| | | |
|---|---|---|
| | step | |
| Dev-Time (I) 0 | Spin time (in seconds) desired in this step | |

Main Calling Program

1. INITIALIZE the system
2. Read - analyze switch depressions
3. DISPLAY - turn on the next digit
4. CHECK FOR Mode of Step change
5. If Mode indicates set up call SET UP.
6. If Mode indicates develop call DEVELOP
7. Go back to #2

INITIALIZATION ROUTINE

1. Set all variables to values below
2. Initialize Peripheral interface Adapters READ Subroutine - Each time a pass is made through this subroutine, a scan is made of the switch matrix. When a switch is depressed, present READ is set in the value corresponding to the switch depressed. It must be held for a number of passes (to eliminate switch bounce) and when it has, READ Output is set to that value
Set Present Read to 255 (No Reading)
For output lines 1 to 4:
Activate the output line
Read the input line
If input line is non-zero, set the switch
Present Read to the value corresponding to the switch closed
If Present Read - Previous Read, increment Read Counter
If Present Read does not equal Previous Read, reset Read Counter
If Present Read = 255, reset Read Counter
If Read Counter = Read Threshold, Set Read output to Previous Read (Signals that a command is available)
If Read Counter is greater than Read Threshold, set Read Counter to 254
Set Previous Read to Present Read
DISPLAY - Activate the strobe line corresponding to the Digit Display Counter (the digit being displayed).
Activate the 7-Segment Output corresponding to the value of digit being displayed.
Increment the Digit Display Counter
If the Digit Display Counter = 10, reset it to 1
CHECK Subroutine - Checks to see if non-numeric commands have been entered and changes state registers accordingly if they have.
If Read Output = 15, then Do
Mode = 2 (SET UP Mode)
Read Output = 254
Set up Digit = 3, Step = 1, Set the Digits to existing values for step 1
If Read Ouptut = 14 then Do
Mode = 3 (DEVELOP Mode)
Read Output = 254
Phase Counter = 0
Step = 0
If Read Output = 13, item Do (End of Program)
Mode = 1 (Stand by Mode)
Read output = 254
Set remaining steps to 254
If Read Output = 12, then Do (Cancel)
Set Set up Digit to 3
Set Digits 3 to 9 to blank
Set Read output to 254
If Read Output = 12 than Do (Skip)
Set Step = Step +1 Display the Digits for the next Step
Set Digit 1 and Digit 2 to new stop number
Set Read Output to 254
If Read Output = 10, then Do (Pause Continue)
If Mode = 1, the set Mode to 3 else set Mode to 1
Set Read Output to 254
DEVELOP Subroutine - Each pass increments the phase Counter and if complete moves on to the next phase
If Phase = 0 then Do
Increment Step
Read command for this step from memory
Set Digits (1-9) to display these commands
Set Phase Counter = 0

-continued

Set Phase Max to Amt X Chem Factor
If Chem = 254 (Signifying end) then Do
Mode = 1
Phase = 0
Step = 0
Display Digits = blank
If Phase = 1 then Do
If phase Counter = 0, then Activate Pump corresponding to proper chemical
Increment Phase Counter
If Phase Counter is greater than Phase Max then Do
Phase Counter = 0
Phase Max = Rotate Factor
Deactivate Pump Motor
If Phase = 2 then Do
If Phase Counter = 0, then Activate Rotate motor Increment phase counter
If Phase Counter is greater than Phase Max then do
Phase = 3
Phase Counter = 0
Phase Max = Dev time desired in this step
Deactivate Rotate Motor
If Phase = 3 then Do
If Phase Counter = 0, then activate Spin Motor
Increment Phase Counter
If Phase Counter is greater than Phase Max then do
Phase = 4
Phase Counter = 0
Phase Max = Rotate Factor
Deactivate Spin Motor
If Phase = 4 then Do
If Phase Counter = 0, then activate Rotate Motor
Increment Phase Counter
If Phase Counter is greater than Phase Max then Do
Phase = 0
Phase Counter = 0
Phase Max = 0
Deactivate Rotate Motor
SET UP Subroutine - whenever a number is input to this routine, it puts the number in digit so that it is displayed. When a complete step is displayed it stores all the commands in memory and gets ready for next step
If Read Ouptut 9, then Return (since there has been no command put in)
If Set up Digit = 3, then set Digit 1 and 2 to the value of the step and clear the rest
Set the Digit to the value of the Read Output
Set Read Output to 254
Increment Set up Digit
If Set up Digit = 10, the Do:
Set Set up Digit to 3
Save Chem, Amt, and Dev Time for this set up Step in memory Increment set up step
Set Digits 1-9 to the existing values for the next step.

Although the invention has been described with reference to a particular embodiment, it will be understood to those skilled in the art that the invention is capable of a variety of alternative embodiments within the spirit and scope of the appended claims.

What is claimed is:

1. An automatic photographic paper and film developing apparatus comprising in combination:

a light tight drum, said light tight drum including a door means to provide access to the inside of said drum, said drum containing a reservoir means in the top of said drum and containing a drain means in the bottom of said drum, means for rotating said drum operatively connected to said drum, means for tilting said drum, said drum being mounted on said tilting means in a horizontal position, said horizontal position being the normal position for said drum on said tilting means, means for filling said drum with a chemical, said filling means containing a plurality of chemicals, means for receiving the chemicals drained from said drum, a temperature regulation means to control the temperature of said plurality of chemicals, and, a control means to control the sequence of operations of said automatic photographic paper and film developing apparatus, said control means controlling said tilting means to tilt said drum to the vertical position to receive one of said plurality of chemicals, said control means activating said fill means to dispense one of said plurality of chemicals to said drum, said control means operating said rotating means, said control means stopping said rotating means and activating said tilt means to drain said chemical into said receiving means, said control means continuing said sequence of operations until the developing process is completed.

2. An automatic photographic paper and film developing apparatus as described in claim 1 further including a means for enclosing said photographic paper and film developing apparatus.

3. An automatic photographic paper and film developing apparatus as described in claim 1 wherein said tilting means comprises in combination:

a first disk means for mounting said drum means and said rotating means, a second disk means connected to said first disk means by a cable attached to each, a switch means operatively connected to said second disk means, a motor means to rotate said second disk means, said switch means being interlocked with said motor means to rotate said second disk means through an arc of 180°, and, a spring means attached to said first disk means by a cable to return said first disk means to the normal position.

4. An automatic photographic paper and film developing apparatus as described in claim 1 wherein said filling means comprises a plurality of containers for holding a chemical, and, a plurality of pump means respectively connected to said plurality of containers to extract said chemical therefrom.

5. An automatic photographic paper and film developing apparatus as described in claim 1 wherein said temperature regulation means comprises:

an adjustable thermostat to vary temperature settings, and, a heating means to supply heat.

6. An automatic photographic paper and film developing apparatus as described in claim 1 wherein said control means comprises in combination:

a central processor unit for controlling the developing process, said control processor operating on a micro-computer program, a read only memory for the permanent storage of micro-computer programs and data, a first and second interface adaptor means to carry data and signals, said first and second interface adaptor means having a plurality of output lines, a decoder means to receive a first set of data lines from said first interface adaptor means, said decoder means providing a plurality of output data lines, a relay means to receive said plurality of output data lines, said relay means respectively providing data lines to said rotating means, said tilting means and said filling means, a switch matrix means to receive respectively a second and third set data lines from said first interface adaptor means, said switch matrix means providing manual control of said photographic paper and film developing apparatus, and a display means connected to said plurality of output lines from said second interface adaptor means to provide a visual output display.

* * * * *